United States Patent Office 2,788,704
Patented Apr. 16, 1957

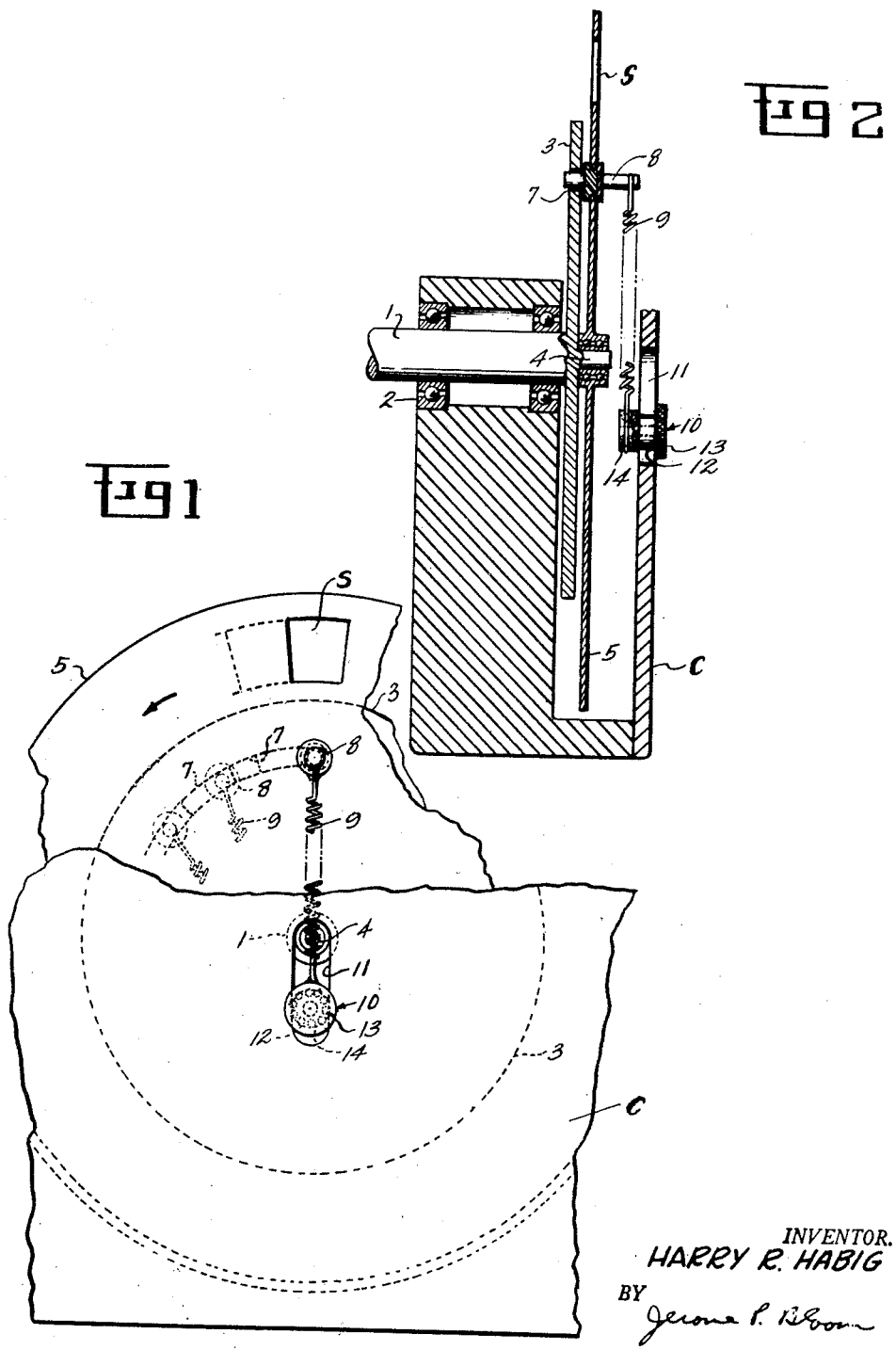

2,788,704

SHUTTER CONTROL MECHANISM

Harry R. Habig, Dayton, Ohio

Application September 7, 1954, Serial No. 454,518

10 Claims. (Cl. 88—19.3)

This invention relates to a new and novel shutter control mechanism for cameras and the like, and particularly for cameras where pictures are to be taken and exposures are to be made under a wide and variable range of conditions and requirements. The highly simplified shutter control mechanism which constitutes the subject invention provides means whereby the shutter acceleration at the time of exposure can be readily adjusted and even while the camera in which it is incorporated is in operation.

The improved and simplified nature of the invention provides a distinct advance in the art of camera shutter control mechanisms and is illustratively presented herein by a simple practical embodiment thereof which clearly defines the novelty presented over prior complex mechanisms directed to the same purpose. The invention both in application and effect results in increased versatility for a camera in which it is incorporated with a maximum predetermined efficiency and at a minimum cost. The example of an embodiment of the invention as presented herein provides a coupling of a shutter and a driving disc which disc is driven through means of the camera main drive shaft, the shutter means being relatively rotatable with respect to the driving disc. There is further provided according to the invention a controlling biasing means grounded at one end to the camera housing structure in adjustably fixed fashion and connected to the shutter means at its other end so as to effect a predetermined bias to the shutter means. By this structural association, as the main drive shaft of the camera is in operation, the biasing means is variably tensioned through each cycle in an identical manner and at a specific identical portion of each cycle a bias is applied to the shutter means which is of such a nature as to cause an accelerated movement of the shutter relative to the driving disc. The exposure is made by the scanning slit in the shutter during this period of acceleration so as to meet the requirements of the particular application of the camera. As will be obvious, by the simple adjustment of the grounded end of the biasing means to apply a predetermined tension thereto a predetermined acceleration of the shutter at the time of exposure may be provided. Thus, by the novel invention a range of shutter acceleration at the time of exposure may be provided in a camera in accordance with the nature of the biasing means utilized and its range of adjustment to vary its biasing effect.

An object of this invention is to provide a new and novel camera shutter mechanism.

A further object of this invention is to provide a highly simplified shutter control mechanism for a camera whereby a predetermined shutter acceleration at the time of exposure throughout a predetermined range may be provided in a camera in which it is incorporated.

Another object of the invention is to provide a novel drive mechanism for a camera shutter whereby the shutter may be relatively accelerated with respect to the main drive speed of the camera by an adjustable biasing means to effect a predetermined acceleration of the shutter at the time of exposure in accordance with the adjustment of said biasing means.

An additional object of the invention is to provide a new and novel highly simplified shutter control mechanism for a camera or the like whereby the shutter acceleration at the time of exposure may be adjusted throughout a predetermined range in a very simple manner and even while the camera is in operation.

Other objects and advantages of the invention will become readily apparent to those versed in the art from the following description thereof taken in conjunction with the accompanying drawings wherein:

Fig. 1 shows a fragmentary front view of a camera incorporating the novel shutter control mechanism constituting the subject invention.

Fig. 2 shows a fragmentary cross-sectional view of the structure shown in Figure 1 of the drawings.

A single practical embodiment of the invention is illustratively presented in the drawings. A simplified shutter control mechanism is presented therein which comprises a camera housing C having a main constant speed drive shaft 1 rotatably mounted in a bearing 2 within the camera housing. A shutter drive disc 3 is integrally connected to and adjacent one end of the drive shaft 1. The shaft 1 also has an extension 4 therefrom of reduced diameter. As shown a disc type shutter 5 is bearingly supported on the extension 4 so as to be rotatable relative thereto. While a disc type shutter is shown, it will be obvious that any other comparable type of shutter may be employed in the exercise of the invention. The drive disc 3 is provided with an arcuate slot 7 therein and a scanning slot S is provided in the shutter element 5. Pin 8 is fixed to the shutter disc 5, radially displaced from the central axis thereof intermediate the central axis and the scanning slit S. The pin 8 extends to either side of the shutter 5 and the inner end thereof extends through the slot 7 in the drive disc 3 for cooperation therewith. The outer end of the pin 8 has a tension spring 9 connected thereto by one end thereof. And the other end of the spring 9 is connected in secured relation to a control pin 10 mounted in a slot 11 in the camera housing C. This control pin 10 serves to control the shutter acceleration at the time of exposure so that exposures can be made with the same camera at a wide range of shutter speeds without affecting the shutter efficiency. The control pin 10 is mounted for fixed adjustable relation to the radial slot 11 in the camera housing C and is arranged to be adjustable relative to the slot 11 by the employment of a quick release clamp means of any suitable sort whereby the pin 10 can be easily released from any fixed position in the slot 11 and adjusted to another position longitudinally thereof to control the acceleration of the shutter at the time of exposure in a manner and for purposes as will be described. As shown in the drawings, the pin 10 consists of a stud member 12 having a shoulder to abut the slotted portion 11 of camera housing C at the inner side thereof and having a threaded recess in the outer end thereof to receive a screw member 13 which is adapted to be adjusted relative thereto to clamp the stud at any selected position longitudinally of the slot 11 in a manner which is believed to be obvious. A bearing 14 is fixed at the inner end of the stud 12 and the spring member 9 is connected at one end thereof to the stud in engagement with the bearing 14 mounted thereon.

Thus, the structure basically provides a rotary shutter 5 being driven by a main constant speed drive shaft 1 through the medium of the pin 8, one exposure being made in every cycle of rotation or each revolution of the shutter disc, with the acceleration of the shutter at the time of exposure being variable to meet the desired or anticipated condition of use and with the acceleration of the shutter at the time of exposure being independent of the speed of the main drive shaft in a manner which the description of the cyclic operation of the apparatus will make clear.

By the novel invention apparatus the acceleration of the shutter 5 at the precise time of exposure is controlled by the spring 9 and the position of the control pin 10 as adjustably fixed in the slot 11 in the camera housing C. The further out that the control pin 10 is positioned from the line defining the central axis of the shaft 1, the greater the acceleration of the shutter and correspondingly its scanning slit at the time of exposure and of course, resultingly, the less the exposure time of the shutter. It is to be understood that the size and the nature of the biasing spring 9 employed will be an acceleration factor and in determining the nature of the spring 9 to be used the desired application of the camera is to be considered along with other design considerations.

In the cyclic function of the invention apparatus the drive disc 3 normally in accordance with the speed of the main drive shaft 1 drives the shutter disc 5 through the medium of the pin 8 being engaged by the rear end of the slot 7 therein. As is obvious also, the set and predetermined tension of the spring 9 on the pin 8 fixed to the shutter 5 varies throughout a cycle of rotation of the shutter and is at a maximum when the pin 8 is 180 degrees from the control pin 10. Beyond this point, as the tension is relieved thereon suddenly, the pin 8 is accelerated by the spring 9 to leave the engaging rear edge of the slot 7 advancing relative thereto to advance the shutter and, of course, the scanning slit therein rapidly to and through the exposure position to effect a predetermined exposure interval. Following the exposure the pin 8 and shutter 5 relatively decelerate. During the whole cyclic operation of the shutter in the example shown and described the main drive shaft 1 continues to rotate at its rated constant speed and as the pin 8 relatively decelerates the slot 7 in the drive disc 3 advances relative to the pin 8 to have the rear end thereof re-engage the pin 8 to again drive and rotate the shutter disc 5 to complete the cyclic rotation thereof. This acceleration of the scanning slit occurs positively and uniformly in the same identical manner and with the identical relative timed cyclic repetition throughout its operation, no matter what the main drive speed of the camera, for any single setting of the control pin 10. It is noted accordingly, that though the example of an embodiment of the invention as presented refers to employing a constant speed drive means, the independent nature of the exposure control by the invention apparatus does not require the employment of any particular constant speed main drive means in a camera in which it is incorporated.

As can be readily seen, the pin 10 can be adjusted relatively in the slot 11 in the camera housing C at any time and by any suitable means either manually or by the use of a power control means and even while the camera is in operation as easily as previously thereto. Thus, it can be seen that versatility is effected to a camera by the incorporation of the novel shutter control mechanism therein in accordance with the invention. A highly simplified shutter control mechanism is so provided as shown herein whereby the exposure interval employed in a particular camera may be increased or decreased through a wide and predetermined range at any time to meet a desired application of the camera in which the inventive mechanism is incorporated. By the positive nature of the structural association of the simple control components utilized in the invention there is also effected an oscillation free mechanism as well as one which functions in a positive cyclically identical fashion in operation for any set condition of use.

As has been mentioned previously, it is an important and novel advance that is provided by the variable shutter acceleration capacity effected by the invention. The shutter incorporated in a camera in accordance with the invention brings a distinct advance in the camera art by the exposure action provided thereby which is independent of the camera drive speed. The use of the invention also enables any camera in which it is incorporated, even though set up to make only one revolution at selected intervals with a single exposure each revolution, to make the exposure time vary as desired to meet a wide range of applications and conditions.

Thus, a novel highly simplified shutter control mechanism is effected by the subject invention which in its very simplicity effects a great and important novel advance in the camera art.

While a particular practical embodiment and application of the invention has been presented herein, many other modifications and applications thereof will be readily apparent therefrom to those versed in the art and such is considered to lie within the scope of this invention.

I claim:

1. A shutter control mechanism comprising, a camera housing, a camera drive means therein, a shutter means coupled to said drive means for rotation therewith and relative thereto, and biasing means connected at one end thereof to said camera housing and at the other end thereof to said shutter means at a point radially displaced from the axis of rotation thereof, said shutter means being normally conjointly driven with said camera drive means, said biasing means being so connected to said camera housing as to normally maintain the driven relation of said shutter means and at a specific portion of each cycle of rotation thereof to uncouple said shutter means from said drive means to effect a relative acceleration of the shutter means so that a predetermined exposure interval may be effected which is independent of the speed of the camera drive means.

2. A shutter control mechanism for cameras or the like comprising, a housing element, a drive means mounted for rotation relative thereto, a shutter normally coupled to said drive means in driven relation thereto, biasing means, means adjustably connecting said biasing means at one end thereof to said housing element and in adjustable relation thereto and at the other end to said shutter to apply a continuously varying bias to said shutter during each cycle of rotation thereof, said biasing means being effective at an identical portion of each cycle to uncouple said shutter means to effect an acceleration thereof relative said drive means at the time of exposure which is independent of said drive means, the adjustment of said biasing means relative to the shutter providing a predetermined exposure interval in accordance with the desired application thereof.

3. A shutter control mechanism for cameras or the like comprising, a camera housing, a drive means therein for moving film through an exposure position in said housing, a shaft means in driven relation to said drive means, an auxiliary drive means connected to said shaft means, a shutter means, a pin fixed to said shutter means and normally engaged in driven relation to said auxiliary drive means, a biasing means connected to said pin and arranged to continuously apply a bias to said pin which is identical cyclically and of a varying nature throughout each cycle, said biasing means at the exposure portion of each cycle effecting an acceleration of said shutter means to displace said pin ahead of its auxiliary drive means and provide an exposure of the film for a predetermined interval which is independent of the speed of said drive means, said biasing means being adjustable to provide any exposure interval desired in accordance with the intended application of the camera.

4. A shutter control mechanism comprising, a camera housing, a main drive means to control film flow therein, a shaft in driven relation to said drive means, a disc drive member integral with said shaft and having an arcuate slot therein, a shutter means having a projection therefrom extending through said slot and normally engaging the rear end thereof to afford a continuous driving of said shutter means thereby, said projection being radially displaced from the axis of rotation of said shutter means and having a spring means connected thereto by one end thereof, a slot in said housing, a pin means adjustably mounted in said slot for quick clamping engagement with the sides thereof, a bearing on said pin means, said spring means having the other end thereof engaging said bearing and being tensioned thereby, the degree of such tensioning being in accordance with the position of the pin means in said slot, and said pin means and said projection being so arranged that in a predetermined portion of each cycle of rotation of said shutter means said spring means will so bias said shutter means as to afford an acceleration thereof at a rate in accordance with the position of said pin means effecting an advance of said projection in said slot which is independent of the speed of said drive means whereby an exposure interval may be provided to meet the conditions of use of the camera by a simple adjustment of said pin means at any instant.

5. The structure as set forth in claim 4, said slot in said housing being radially arranged relative to the axis of rotation of said shutter means whereby the shutter means may provide an exposure interval which is decreased in direct relation to the adjustment of said pin means radially outward of said axis of rotation of the shutter means.

6. A shutter control mechanism for a camera or the like having a constant speed drive means comprising, a control element operatively connected to said drive means, a shutter means mounted coaxially with said control element, said control element having means normally operatively engaging with said shutter means and driving said shutter means at a speed corresponding to the speed of the drive means, said engaging means being disengageable relative said shutter means and accelerating means connected continuously to said shutter means at a point radially displaced from the axis of rotation thereof throughout the cyclic rotation thereof and operative at the exposure portion of its cycle, disengaging said engaging means to effect a predetermined acceleration of said shutter means relative to said control element to provide an exposure interval for the camera to meet the desired application thereof which interval is cyclically identical.

7. A shutter control mechanism for a camera or the like having a drive means to provide film flow therein comprising, control means operatively connected to said drive means for direct drive therebetween, shutter means rotatably mounted adjacent said control means and normally driven thereby in the cyclic operation thereof, accelerating means continuously connected to said shutter means at a point radially displaced from the axis of rotation thereof and operative at the exposure portion of its cycle in cyclically identical fashion to effect a predetermined acceleration of said shutter means relative to said control means, and means connected to said accelerating means and radially adjustable relative said axis of rotation of said shutter means adjustable to vary the accelerating effect thereof to provide an exposure interval for the camera to meet the conditions of use.

8. The structure as set forth in claim 7, said accelerating means comprising a spring biasing means connected at one end to said shutter means and at its other end to said adjusting means, the said biasing means being effective only at the exposure portion of each cycle to provide the relative acceleration of said shutter means.

9. A shutter control mechanism for cameras or the like having a drive means to provide film flow therein comprising, an auxiliary drive means operatively connected to said film drive means, a control disc connected for driving relation therewith and having a slot therein, a shutter means having a pin fixed thereto and normally engaged in said slot in driven relation to said control disc, and accelerating means continuously connected to said shutter means throughout the cyclic operation thereof and operative at the exposure portion of each cycle to effect a predetermined acceleration of said shutter means relative to said control disc advancing said pin relative said slot whereby an exposure interval may be provided which is positive in nature and cyclically identical.

10. A shutter control mechanism for cameras or the like having a drive means therein comprising an auxiliary drive means operatively connected thereto, a control disc element integrally connected to said auxiliary drive means for rotation therewith, a shutter means rotatably mounted adjacent said control disc element and having means connected therewith normally operatively engaged by said control disc element to drive said shutter means to effect cyclic rotation thereof, said means connected with said shutter being disengageable relative said control disc and accelerating means continuously connected to said shutter means at a point radially displaced from the axis of rotation thereof and operative at the exposure portion of its cycle in cyclically identical fashion to effect a disengagement of said shutter and said control disc and a predetermined acceleration of said shutter means relative to said control disc element, and means connected to said accelerating means and adjustable to vary the accelerating effect thereof at any instant to provide any exposure requirement necessary within a predetermined range.

References Cited in the file of this patent
UNITED STATES PATENTS

| | | |
|---|---|---|
| 467,454 | Walker | Jan. 19, 1892 |
| 574,113 | Robertson | Dec. 29, 1896 |
| 1,700,513 | Porter | Jan. 29, 1929 |
| 2,249,517 | Crumrine | July 15, 1941 |
| 2,420,597 | Hutchison et al. | May 13, 1947 |